United States Patent
Bott et al.

(10) Patent No.: US 7,063,378 B2
(45) Date of Patent: Jun. 20, 2006

(54) COVER FOR AN OPENING IN THE ROOF SURFACE OF A MOTOR VEHICLE AND A METHOD FOR MANUFACTURING THE SAME

(75) Inventors: Guido Bott, Munich (DE); Thomas Schroeferl, Hohenschaeftlan (DE); Michael Wallisch, Nuremberg (DE); Karl Stangl, Utting (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/887,357

(22) Filed: Jul. 9, 2004

(65) Prior Publication Data

US 2005/0073176 A1   Apr. 7, 2005

(30) Foreign Application Priority Data

Jul. 10, 2003   (DE) ................. 103 31 270

(51) Int. Cl.
*B60J 7/043*   (2006.01)

(52) U.S. Cl. ................................ 296/216.09

(58) Field of Classification Search ........... 296/216.09, 296/211, 215
See application file for complete search history.

(56) References Cited

U.S. PATENT DOCUMENTS

| | | | |
|---|---|---|---|
| 4,738,482 A | | 4/1988 | Böhm et al. |
| 5,154,481 A | * | 10/1992 | Paetz et al. .................. 296/211 |
| 5,524,955 A | | 6/1996 | Brocke et al. |
| 6,540,289 B1 | | 4/2003 | Bergmiller et al. |
| 6,942,288 B1 | * | 9/2005 | Paetz et al. ............ 296/216.09 |
| 2004/0160090 A1 | * | 8/2004 | Teschner ..................... 296/211 |
| 2004/0183342 A1 | * | 9/2004 | Paetz et al. ............ 296/216.09 |

FOREIGN PATENT DOCUMENTS

| | | |
|---|---|---|
| DE | 37 42 719 A1 | 7/1989 |
| DE | 197 44 385 A1 | 4/1998 |
| DE | 19918150 | 10/2000 |
| EP | 1 026 022 A2 | 8/2000 |
| FR | 2 814 705 A1 | 4/2002 |
| GB | 2 147 244 A | 5/1985 |
| JP | 406191280 * | 7/1994 ............ 296/216.09 |

\* cited by examiner

*Primary Examiner*—Dennis H. Pedder
(74) *Attorney, Agent, or Firm*—David S. Safran

(57) ABSTRACT

A cover for an opening in the roof surface of a motor vehicle including a glass pane which is provided with peripheral foam at its bottom surface in the edge area at least over a part of the periphery. On the edge of the peripheral foam which points toward the middle of the glass pane, an undercut is formed between the bottom surface of the glass pane and the peripheral foam, the undercut extending at least 3 mm into the peripheral foam. A method for manufacturing such a cover is also provided.

14 Claims, 2 Drawing Sheets

COVER FOR AN OPENING IN THE ROOF SURFACE OF A MOTOR VEHICLE AND A METHOD FOR MANUFACTURING THE SAME

BACKGROUND OF THE INVENTION

1. Field of the Invention

This invention relates to a cover for the opening in the roof surface of a motor vehicle and a corresponding method for manufacturing such a cover.

2. Description of Related Art

Glass covers for motor vehicle roofs in which the glass pane is foamed in its peripheral edge area have been known for a long time. Examples of these generic covers are described in published German Patent Application DE 37 42 719 A1, German Patent DE 43 08 215 C1 which corresponds to U.S. Pat. No. 5,524,955, published German Patent Application DE 35 06 009 A1 which corresponds to U.S. Pat. No. 4,738,482, German Patent DE 100 36 630 C1 which corresponds to U.S. Pat. No. 6,540,289, German Patent DE 199 18 150 C1, and published German Patent Application DE 197 44 385 A1. In all these references, glass covers are disclosed in which an inside cover sheet which is used for reinforcement and attachment of the glass pane is foamed in at the same time.

In published German Patent Application DE 37 42 719 A1 and the U.S. Pat. No. 6,540,289, the inside cover sheet has a bulge or a bead by which the inside cover sheet rests on the bottom of the glass pane. In this way, the penetration of the foam mass in the direction to the middle area of the glass pane can be limited. In this manner, the inside cover sheet toward the middle area of the glass pane projects beyond the peripheral foam. This arrangement is also described in the German Patent DE 199 18 150 C1.

In the cover described in U.S. Pat. No. 5,524,955, a foam strip is inserted between the inside cover sheet and the bottom of the glass pane in order to limit the penetration of the foam mass in the direction to the middle area of the glass pane. The same effect is achieved in the cover described in the U.S. Pat. No. 4,738,482 by a sealing profile which is inserted between the inside cover sheet and the bottom of the glass pane.

Published German Application DE 197 44 385 A1 discloses a cover in which the peripheral foam has a very small undercut which is not detailed, and which points toward the middle area of the glass pane.

When the glass pane of a glass cover breaks, a collar of slivers generally forms on the edge of the peripheral foam or the inside cover sheet, the edges of the slivers pointing toward the middle area of the cover. In other words, when the glass pane breaks, an accumulation of glass slivers project toward the inside and toward the middle area of the cover from the edge of the peripheral foam or of the inside cover sheet, the edges pointing toward the middle area of the cover. Such formation of slivers is hazardous to the passengers, and in the case of an accident, also for the rescuers assisting the passengers.

SUMMARY OF THE INVENTION

The primary object of the present invention is to provide a glass cover for a motor vehicle in which, in the case of breakage of the glass pane, minimizes the hazard caused by a collar of slivers that project from the peripheral foam towards the middle area of the cover. Another object of the present invention is to provide a method for manufacturing such a cover.

The above noted objects are achieved by a cover and a method for manufacturing such a cover. The present invention is advantageous in that the edge of the peripheral foam which points toward the middle area of the glass pane is provided with an undercut between the bottom surface of the glass pane and the peripheral foam which extends at least 3 mm, preferably at least 5 mm, into the peripheral foam. By providing such an undercut, formation of slivers projecting toward the middle area of the cover over the edge of the peripheral foam in the case of glass pane breakage can be reliably prevented at the conventional glass pane thicknesses. Instead, slivers which are held by the peripheral foam project into the area of the undercut where they are covered from the bottom surface by the peripheral foam so that the danger of injury can be greatly reduced.

These and other advantages and features of the present invention will become more apparent from the following detailed description of the preferred embodiments of the present invention when viewed in conjunction with the accompanying drawings.

DETAILED DESCRIPTION OF THE INVENTION

Figure 1:
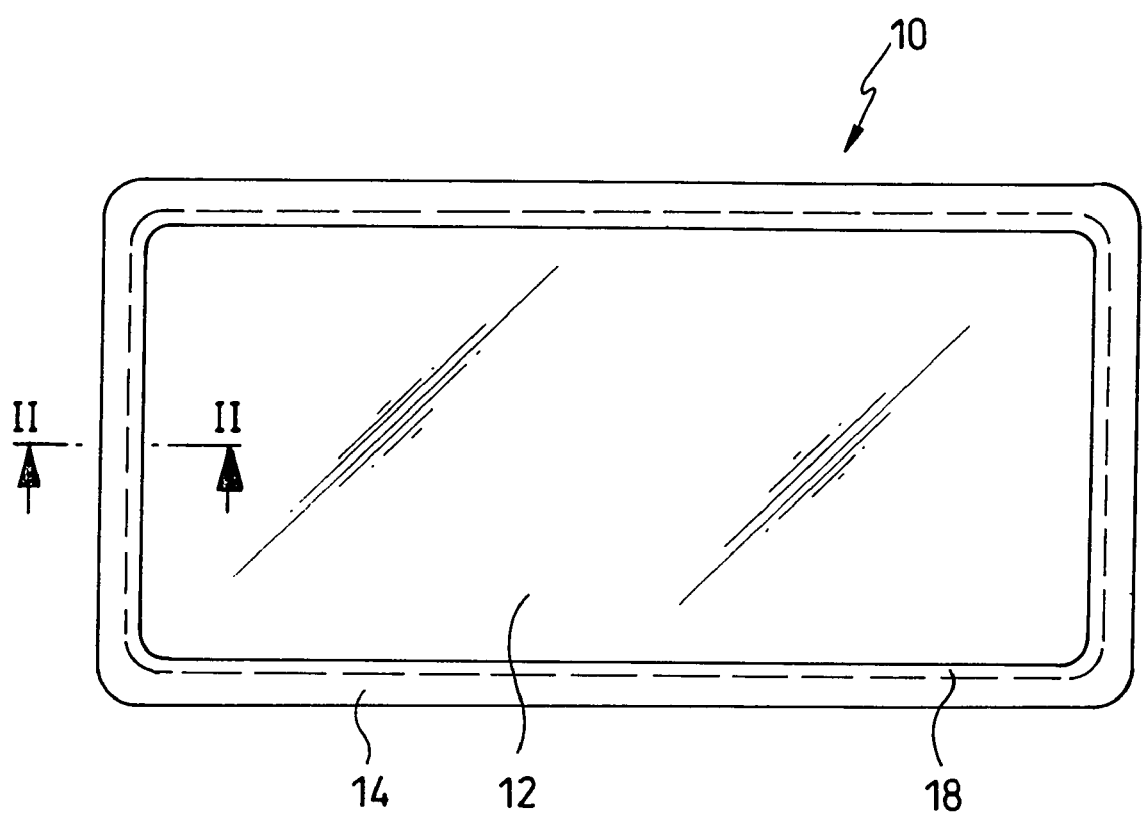
FIG. 1 shows a schematic view of a cover in accordance with one embodiment of the present invention as viewed from underneath the cover.

FIG. 1 schematically shows a view of a glass cover 10 for an opening of a roof surface of a motor vehicle, as viewed from underneath. The cover 10 is preferably implemented as an adjustable cover of a sliding roof, a sliding and lifting roof, a raising roof, or an externally guided sliding roof. Of course, the cover 10 may also be implemented as a cover which is mounted permanently on the body.

The cover 10 includes a glass pane 12 which, at its peripheral edge area along the bottom surface, is provided with peripheral foam 14, which in the illustrated embodiment, may be made of polyurethane. Of course, other materials may be used in other embodiments. As most clearly shown in FIG. 2, a supporting element such as the inside cover sheet 16 is foamed into the peripheral foam 14. As noted, the cover is positioned and illustrated upside down in FIGS. 2 to 4 so that the bottom surface of the cover is facing upwardly. The inside cover sheet is not shown in FIG. 1 but is clearly shown in the partial cross-sectional view of FIG. 2. The peripheral foam 14 is used in the conventional manner as a carrier for the peripheral cover edge seal (not shown), as a carrier for the supporting element such as the inside cover sheet 16, and as reinforcement for the edge of the glass pane 12. The inside cover sheet 16 is located within the peripheral foam 14 and at a distance from the glass pane 12.

Figure 2:
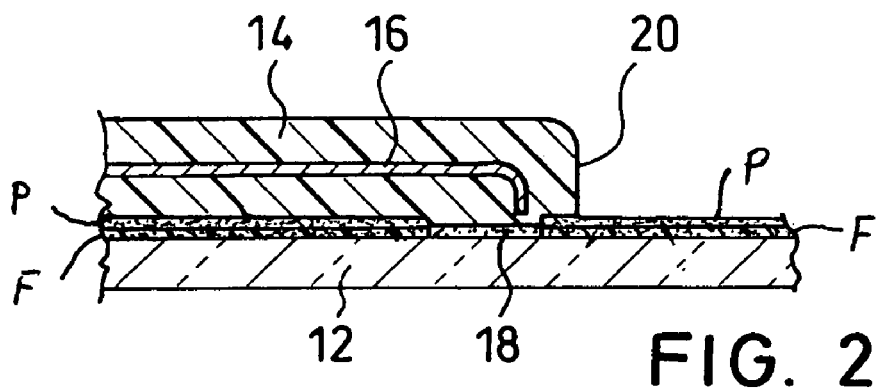
FIG. 2 shows a partial cross-sectional view of the cover along the line II—II of FIG. 1, the left edge of the cover in FIG. 2 not being shown and the cover being positioned upside down so that the bottom surface is facing upwardly.

In the embodiment shown in FIG. 2, the bottom surface of the glass pane 12 is provided with a strip 18 positioned at the edge area of the peripheral foam 14 which points toward the middle area of the cover or middle area of the glass pane (i.e., in the inside edge area of the peripheral foam 14). The strip 18 is adhered to the bottom surface of the glass pane 12 but is smooth and anti-adhesive at its top surface in order to prevent adhesion of the peripheral foam 14 to the extent possible. Preferably, the strip 18 is implemented using TEFLON® polytetrafluoroethylene tape. By providing the polytetrafluoroethylene tape 18, which is attached before peripheral foaming of the glass pane 12 to its bottom surface, an undercut is formed in the peripheral foam 14 between the peripheral foam 14 and the bottom surface of the glass pane 12 during peripheral foaming. The undercut extends from the edge of the peripheral foam 14 which points toward the middle area of the glass pane as shown. In one embodiment of the present invention, the undercut extends at least 3 mm into the peripheral foam in order to prevent a collar of slivers that points toward the middle area of the glass pane 12 from projecting over the edge 20 of the peripheral foam 14 when the glass pane 12 breaks. In another advantageous embodiment, the undercut extends a maximum of 15 mm into the peripheral foam 14. As shown in FIG. 1, both the peripheral foam 14 and the undercut are peripherally provided.

The bottom surface of the glass pane 12 in the edge area can be provided with a glass frit F which is provided with a recess, preferably in the area of the adhesive strip 18. Similarly the bottom surface of the glass pane 12 can be provided with a so-called primer P in the edge area, i.e. an adhesive between the bottom surface of the glass pane or the glass frit and the peripheral foam 14. In such implementation, the bottom surface of the glass pane in the edge area would be free of primer in the area of the adhesive strip 18.

In the process or method of manufacturing the cover 10, the bottom surface of the glass pane 12 is first provided with an adhesive strip 18. The cover 10 is inserted with its bottom surface upward into the foaming tool into which the inside cover sheet 16 is also inserted. Then, the tool is closed and the polyurethane foam mass is placed in the tool. After setting of the peripheral foam 14, the tool is opened and the cover 10 is removed.

Figure 3:
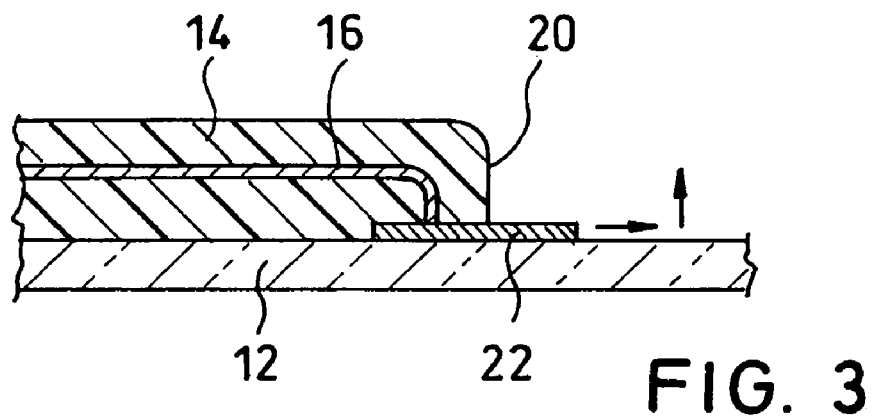
FIG. 3 shows a partial cross-sectional view like that shown in FIG. 2 of a cover in accordance with another embodiment in the intermediate stage of production.

FIG. 3 shows a modified embodiment in which the undercut is not made by an adhesive strip 18 as described above, but by a slide 22. The slide 22 may be provided on the upper tool of the foaming tool. After the completion of the peripheral foaming, the slide 22 is removed from the cover 10 in the manner indicated in FIG. 3 by the arrows thereby forming the undercut which is exposed. Of course, the slide 22 is implemented such that it does not adhere to the bottom surface of the glass pane 12.

Figure 4:
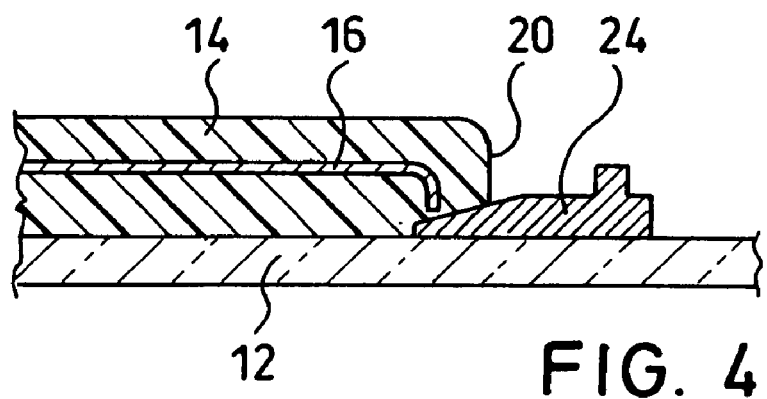
FIG. 4 shows a partial cross-sectional view like that shown in FIG. 2 of a cover in accordance with still another embodiment.

In the embodiment of FIG. 4, the undercut is formed by initially inserting an insertion element 24 before closing the tool on the bottom surface of the glass pane 12, and peripheral foaming filling with the insertion element 24. If the insertion element 24 is implemented to be reusable, after removing the peripherally foamed glass pane 12 from the foaming tool, the insertion element 24 being removed to form the undercut and then be reused. Of course, the insertion element 24 is implemented such that it does not adhere to the bottom surface of the glass pane 12.

Alternatively, in accordance with other embodiments, the undercut may also be provided by using a corresponding tool-bonded element or a corresponding tool seal in the foaming process.

In the methods of providing a cover shown in FIGS. 3 and 4 is especially advantageous in that additional elements for the cover itself are not required. This ensures that the additional cost for manufacturing the present invention only includes costs for the tool.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A cover for an opening in a roof surface of a motor vehicle comprising:
   a glass pane having a bottom surface, a middle area, and an edge area;
   a peripheral foam provided along at least a portion of the edge area on the bottom surface, the peripheral foam having an edge which points toward the middle area of the glass pane;
   wherein the edge of the peripheral foam includes an undercut extending at least 3 mm into at least a part of the peripheral foam between the bottom surface of the glass pane and the peripheral foam.

2. The cover as claimed in claim 1, wherein the undercut extends a maximum of 15 mm into the peripheral foam.

3. The cover as claimed in claim 1, further including a strip that at least partially fills the undercut, the strip being adhered to the bottom surface of the glass pane.

4. The cover as claimed in claim 3, wherein the strip includes an anti-adhesive surface that faces the peripheral foam.

5. The cover as claimed in claim 4, wherein the anti-adhesive surface is formed by polytetrafluoroethylene.

6. The cover as claimed in claim 3, wherein the bottom surface of the glass pane is provided with a glass frit including a recess.

7. The cover as claimed in claim 3, wherein the bottom surface of the glass pane is provided with a primer along a portion of the edge area, the part of the edge area where the strip is adhered being free of said primer.

8. The cover as claimed in claim 1, further including a supporting element foamed into the peripheral foam.

9. The cover as claimed in claim 8, wherein the supporting element is located at a distance from the glass pane.

10. The cover as claimed in claim 8, wherein the supporting element is an inside cover sheet.

11. The cover as claimed in claim 1, wherein the undercut is filled by at least one insertion element that does not adhere directly to the bottom surface of the glass pane.

12. The cover as claimed in claim 1, wherein the peripheral foam and the undercut are peripherally provided along the edge area of the glass pane.

13. The cover as claimed in one claim 1, wherein the peripheral foam is made of polyurethane.

14. The cover as claimed in claim 1, wherein the undercut is visible at the edge of the peripheral foam.

* * * * *